United States Patent
Schumacher

(10) Patent No.: US 10,033,175 B1
(45) Date of Patent: Jul. 24, 2018

(54) APPARATUS AND METHODS FOR CABLE CLAMPING TECHNIQUES

(71) Applicant: Radio Frequency Systems GmbH, Hannover (DE)

(72) Inventor: Otto Schumacher, Hannover (DE)

(73) Assignee: Nokia Shanghai Bell Co., Ltd, Shanghai (CN)

( * ) Notice: Subject to any disclaimer, the term of this patent is extended or adjusted under 35 U.S.C. 154(b) by 0 days.

(21) Appl. No.: 15/442,944

(22) Filed: Feb. 27, 2017

(51) Int. Cl.
- F16L 3/08 (2006.01)
- H02G 3/30 (2006.01)
- F16L 3/137 (2006.01)
- F16L 3/02 (2006.01)

(52) U.S. Cl.
CPC .......... *H02G 3/24* (2013.01); *F16L 3/02* (2013.01); *F16L 3/137* (2013.01)

(58) Field of Classification Search
CPC .......... F16L 3/02; F16L 3/12; F16L 3/133
See application file for complete search history.

(56) References Cited

U.S. PATENT DOCUMENTS

| | | | | |
|---|---|---|---|---|
| 1,966,899 A | * | 7/1934 | McCabe | F16L 3/133 248/62 |
| 3,194,590 A | * | 7/1965 | Cook | F16L 3/133 248/62 |
| 4,240,602 A | * | 12/1980 | McDonald | F16L 3/133 248/317 |
| 4,309,263 A | * | 1/1982 | Boyd | E02B 17/027 204/196.17 |
| 4,542,871 A | | 9/1985 | Fortsch | |
| 4,705,331 A | * | 11/1987 | Britton | E02B 17/0026 24/463 |

(Continued)

FOREIGN PATENT DOCUMENTS

| | | |
|---|---|---|
| CN | 201048262 Y | 4/2008 |
| CN | 202474331 U | 10/2012 |

(Continued)

OTHER PUBLICATIONS

V. Pachner, et al.; "EMI measurement of small systems using an absorbing clamp"; Published in Instrumentation and Measurement Technology Conference; May 1997; 1 pg.

(Continued)

*Primary Examiner* — Amy J. Sterling
(74) *Attorney, Agent, or Firm* — Parker Justiss, PC

(57) ABSTRACT

An apparatus comprising a clamp. The clamp can include a plate. The plate can include a mounting opening to accommodate a shaft of a bolt module there-through and to stop an end of the bolt module from passing through, and cable tie openings. The clamp can also include a tube projecting from the plate, where an opening in the tube is coaxial with the mounting opening. The clamp can also include a non-metal curled coupling member sized to wrap around a portion of a cable and a non-metal coupling spacer member having a base portion and spacing arms projecting from the base portion. Ends of the spacing arms can be configured to contact the curled coupling member and the base portion has an opening coaxial with the mounting opening and the opening in the tube. A clamp and cable assembly and methods of manufacturing the clamp and assembling the clamp and the cable are also disclosed.

14 Claims, 8 Drawing Sheets

(56) References Cited

U.S. PATENT DOCUMENTS

| | | | |
|---|---|---|---|
| 4,958,791 A | | 9/1990 | Nakamura |
| 5,052,654 A | * | 10/1991 | Means ................ B28B 23/0056 248/74.3 |
| 5,799,916 A | * | 9/1998 | Lechner .................... F16L 1/24 114/267 |
| 6,290,195 B1 | * | 9/2001 | Deuer .................... A47B 96/06 248/230.8 |
| 6,537,104 B1 | | 3/2003 | Hagmann et al. |
| 8,905,361 B2 | | 12/2014 | Gollin et al. |
| 9,370,129 B2 | | 6/2016 | Berman |

FOREIGN PATENT DOCUMENTS

| | | |
|---|---|---|
| CN | 202840446 U | 3/2013 |
| CN | 205583564 U | 9/2016 |
| DE | 9212516 U1 | 11/1992 |
| JP | H09133257 A | 5/1997 |
| JP | 2003274544 A | 9/2003 |
| WO | 9965127 A1 | 12/1999 |
| WO | 2016096149 A2 | 6/2016 |

OTHER PUBLICATIONS

"Morse Cloth Exterior Cable 1-5-8—Tower clamp for tower"; 7 pgs.
"Self-Locking Hanger for Radiating Cable & Leaky Cable"; HDG Cellular Site Materials; Xiamen HDG Telecom Equipments Co., Ltd.; 2 pgs.

\* cited by examiner

APPARATUS AND METHODS FOR CABLE CLAMPING TECHNIQUES

TECHNICAL FIELD

This application is directed, in general, to an apparatus and methods of connecting telecommunication cables for example to building or tunnel structures, and in particular, apparatuses that minimizes intermodulation signals.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Cables are often installed in buildings and tunnels to provide radio frequency (RF) coverage by being mounted to walls or sealing using clamps. Such cables have apertures in their outer conductor that serve as a radiating element through the aperture, such that a plurality of apertures creates an antenna array to provide wireless telecommunication services.

To help avoid interference in RF signals being transmitted by the cables, the cable clamps are often made of plastic material. To help prevent the cable from dropping from the sealing or wall in case of a fire, metal clamping structures are often placed at regular intervals instead of plastic clamps.

Metallic material in proximity to an aperture of the radiating element can generate intermodulation RF signals which can interfere with wireless telecommunication signals, thereby deteriorating the quality of the wireless phone calls or even cause dropped calls. Intermodulation RF signals are created when high power signals transmitted by the cable impact with metal clamping structures. Various factors such as non-linearity of oxide layers on the metal, the presence of ferromagnetic material, loose or moving metal-to-metal contacts, can all affect the strength of the intermodulation RF signals created and radiated by metallic clamping components and received by the cable.

SUMMARY OF ILLUSTRATIVE EMBODIMENTS

One embodiment is an apparatus comprising a clamp. The clamp can include a plate. The plate can include a mounting opening to accommodate a shaft of a bolt module therethrough and to stop an end of the bolt module from passing through, and cable tie openings. The clamp can also include a tube projecting from the plate, where an opening in the tube is coaxial with the mounting opening. The clamp can also include a non-metal curled coupling member sized to wrap around a portion of a cable and a non-metal coupling spacer member having a base portion and spacing arms projecting from the base portion. Ends of the spacing arms can be configured to contact the curled coupling member and the base portion has an opening coaxial with the mounting opening and the opening in the tube.

Some embodiments of the apparatus include metal cable ties, wherein each of the cable ties is sized to wrap around the portion of the cable and to pass through one of the metal cable tie openings. Some embodiments include cable tie locks configured to secure cable ties that are wrapped around a portion of the cable, the cable tie locks are locatable on the back side of the clamp module.

In any such embodiments the plate, the bolt module and the metal cable ties can be made of a non-ferromagnetic metal and the curled coupling member and the coupling spacer can be made of plastic. In any such embodiments, the cable tie openings can be surrounded by an electrical insulator, the insulator configured to accept a cable tie therethrough.

In any such embodiments, the curled coupling member can have ends configured to rest on ridged indexes provided on a jacket of the cable when the curled coupling member is wrapped around the portion of the cable.

In some embodiments, the curled coupling member can include a first curled member and second curled member where interlocking ends couple the first and second curled members together and opposite ends of the first and second curled members contact the cable.

In some embodiments, the bolting module can include a nut embedded in the base portion of the coupling spacer member, wherein one end of the shaft of the bolting module is a threaded shaft configured to screw into the nut.

In any such embodiments, the bolt module can further include a nut configured to fasten to the end of the bolt shaft that passes through the tube of the mounting plate to thereby attach the clamp to a surface mounting plate.

Some embodiments of the apparatus further include a plurality of the clamps and a cable held by each one of the clamps. In some embodiments the apparatus is part of a wireless telecommunication system.

Another embodiment is an assembly comprising any embodiment of the clamp and a cable configured to radiate radio frequency signals, the cable including apertures in the outer conductor of the cable that are positioned on the front side of the clamp. In some embodiments the cable is configured to radiate RF signals through the apertures.

Another embodiment is a method comprising coupling a base portion of a non-metal spacer member of a clamp to a plate of the clamp. The method can also comprise mounting the base portion and the plate to a mounting surface, including passing a shaft of a bolt module through an opening in the base portion, an opening in the plate and opening in a tube projecting from the plate. The opening in the base portion and the opening of the plate are sized to stop an end of the bolt module from passing through, and the opening in the tube is coaxial with the mounting opening. The method can further comprise wrapping a curled coupling member of the clamp around a portion of a cable and coupling the curled coupling member to contact spacer arms projecting from the base portion of the spacer member.

Embodiments of the method can further include securing metal cable ties around the cable and through cable tie openings in the plate. In some embodiments wrapping the curled coupling member around the portion of the cable can further include orienting the cable such that apertures in the outer conductor of the cable are positioned on the front side of the clamp. Embodiments of the method may include connecting the cable to a plurality of the clamps mounted to the mounting surface.

Another embodiment is a method comprising forming a plate. The plate can include a mounting opening sized to accommodate a shaft of a bolt module there-through and to stop an end of the shaft from passing through, and cable tie openings. The method can further comprise forming a tube configured to project from the plate, where an opening in the tube is coaxial with the mounting opening. The method can further comprise forming a non-metal curled coupling member sized to wrap around a portion of a cable and forming a non-metal coupling spacer having a base portion and spacing arms projecting from the base portion. Ends of the spacing arms can be configured to contact the curled coupling member and the base portion has an opening which when coupled to the plate and tube is coaxial with the mounting opening and the tube opening.

Embodiments of the method can include providing metal cable ties, where each of the cable ties has a length to wrap around an insulating jacket of the cable and a width and a thickness to pass through one of the cable tie openings. Embodiments of the method can include covering each of the cable tie openings with an electrical insulator.

BRIEF DESCRIPTION OF THE DRAWINGS

Reference is now made to the following descriptions taken in conjunction with the accompanying drawings, in which.

In the Figures and text, similar or like reference symbols indicate elements with similar or the same functions and/or structures.

Figure 1:
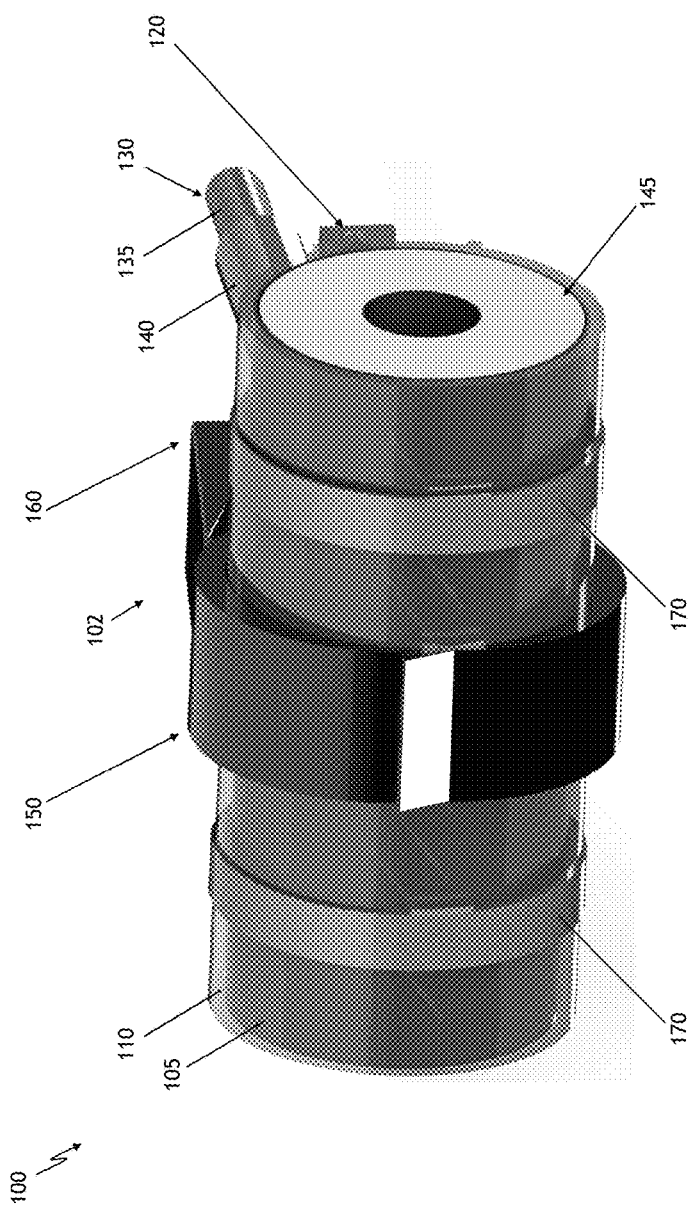
FIG. 1 presents a front-side perspective view of an example apparatus embodiment of the disclosure with a cable inserted into a clamp of the apparatus.

In the Figures, the relative dimensions of some features may be exaggerated to more clearly illustrate one or more of the structures or features therein.

Herein, various embodiments are described more fully by the Figures and the Detailed Description. Nevertheless, the inventions may be embodied in various forms and are not limited to the embodiments described in the Figures and Detailed Description of Illustrative Embodiments.

DETAILED DESCRIPTION

The description and drawings merely illustrate the principles of the inventions. It will thus be appreciated that those skilled in the art will be able to devise various arrangements that, although not explicitly described or shown herein, embody the principles of the inventions and are included within its scope. Furthermore, all examples recited herein are principally intended expressly to be for pedagogical purposes to aid the reader in understanding the principles of the inventions and concepts contributed by the inventor(s) to furthering the art, and are to be construed as being without limitation to such specifically recited examples and conditions. Moreover, all statements herein reciting principles, aspects, and embodiments of the inventions, as well as specific examples thereof, are intended to encompass equivalents thereof. Additionally, the term, "or," as used herein, refers to a non-exclusive or, unless otherwise indicated. Also, the various embodiments described herein are not necessarily mutually exclusive, as some embodiments can be combined with one or more other embodiments to form new embodiments.

Embodiments of the disclosure benefit from the recognition that intermodulation signals are caused by the metal components, e.g., screws, nuts, metal clips, of closing mechanisms of cable clamping structures, and that intermodulation signals can be accentuated by even slight movements of cables held in such closing mechanisms. The disclosed embodiments also benefit from the recognition that previous effort to mitigate the formation of intermodulation signals by electrically insulating such metal components often fail due to the unreliability of achieving and maintaining insulation e.g., due to sharp edges of the metal components and potential abrasion of the insulating material during installation and operation.

As further illustrated below, embodiments of the disclosure feature a clamp with metal clamping components at the back side (e.g., the side nearest the mounting surface) of the clamp module to thereby maximum the distance of the closing mechanism away from the radiating apertures of the cable located at the front side of the clamp module, but still keep the cable in its mounted position in case of fire. Non-metal components of the clamp module electrically insulate metal clamping components from each other and from metal mounting components, and, facilitate alignment of the cable in the clamp module. In some embodiments, the metal components are made of non-ferromagnetic metals to help mitigate the creation excessive intermodulation signals.

Figure 2:
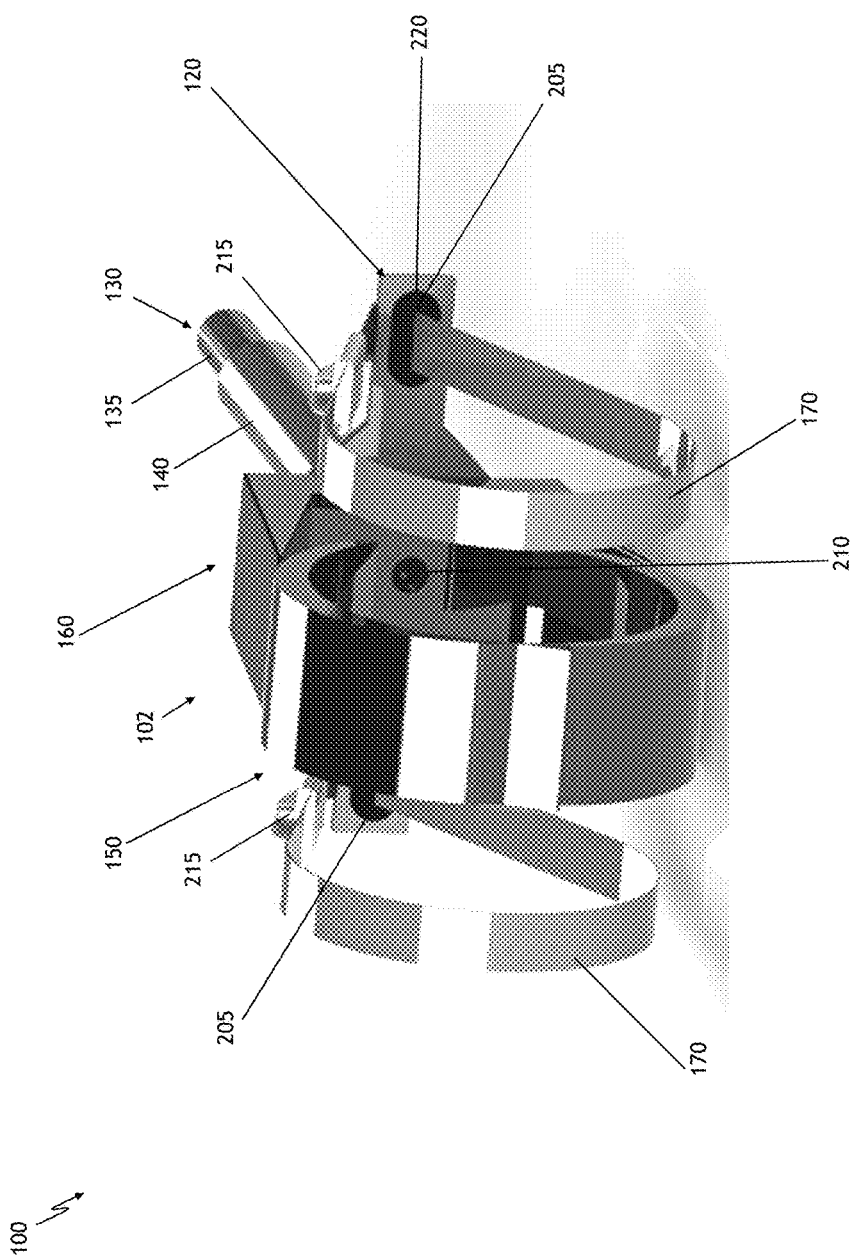
FIG. 2 presents a front-side perspective view of an example apparatus embodiment of the disclosure, analogous to the apparatus depicted in FIG. 1, but with the cable not shown.
Figure 3:
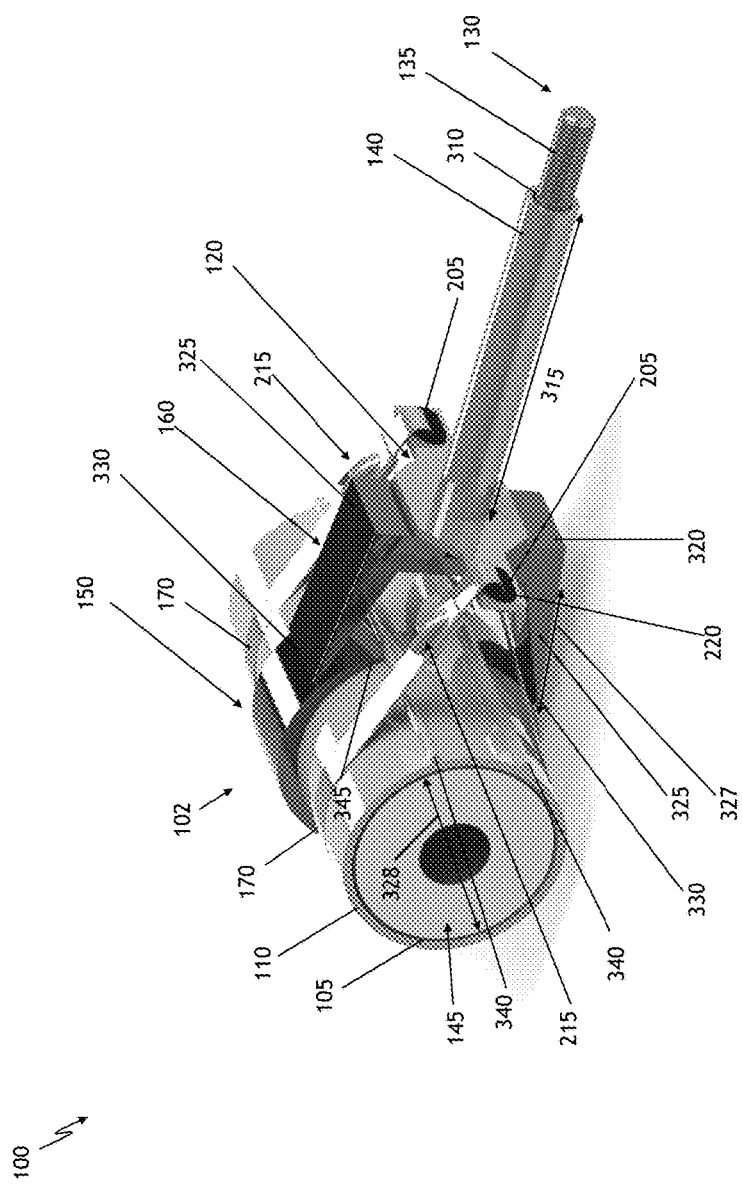
FIG. 3 presents a back-side perspective view of an example apparatus embodiment of the disclosure, analogous to the apparatus depicted in FIG. 1.
Figure 4:
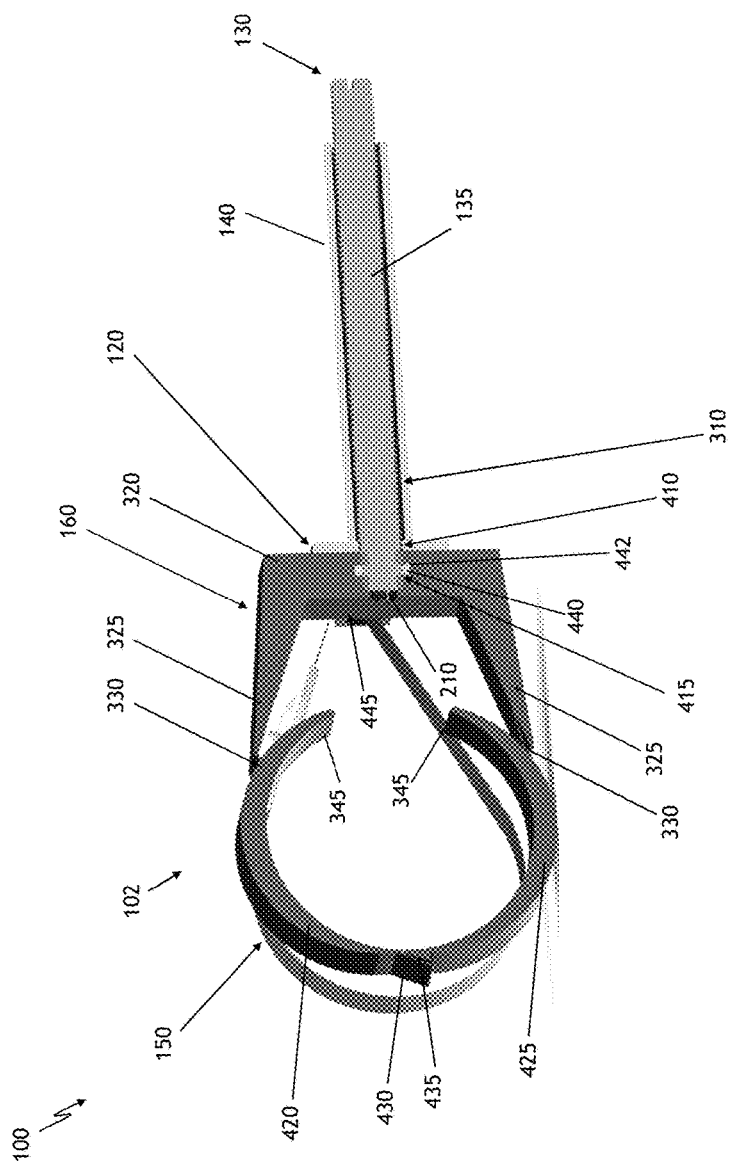
FIG. 4 presents a back-side cut-away perspective view of an example apparatus embodiment of the disclosure, analogous to the apparatus depicted in FIG. 3, but with the cable not shown.

One embodiment of the disclosure is an apparatus (e.g., a cable mounting apparatus). FIG. 1 presents a front-side perspective view of an example apparatus 100 embodiment of the disclosure comprising a clamp 102. The apparatus 100 is depicted with a cable 105 having a jacket 110 (the jacket shown semi-transparently). FIG. 2 presents a front-side perspective view of an example apparatus 100 analogous to the apparatus depicted in FIG. 1, but with the cable 105 not shown. FIG. 3 presents a back-side perspective view of an example apparatus 100 embodiment of the disclosure, analogous to the apparatus depicted in FIG. 1, again depicted with a cable 105 being held by the clamps 102. FIG. 4 presents a back-side cut-away perspective view of an example apparatus 100, analogous to the apparatus depicted in FIG. 3, but with the cable not shown.

The term back side of the clamp (also referred to as clamp module) as used herein means the side of the clamp that in use is attached to and facing a mounting surface e.g., a building wall or ceiling surface or tunnel surface. The term front side of the clamp as used herein means the side of the clamp that in use is facing away from the mounting surface (and thus facing away from the back side of the clamp) and typically facing towards the space defined by the mounting surface, when mounted.

With continuing reference to FIGS. 1-4 throughout, the clamp 102 includes a plate 120. The plate 120 includes a mounting opening 410 to accommodate a bolt module 130 shaft 135 there-through and stop an end 415 of the bolt module 130 from passing through the opening 410. The plate 120 also includes cable tie openings 205.

The clamp 102 also includes a tube 140 projecting from the plate 120, where an opening 310 in the tube 140 is coaxial with the mounting opening 410 of the plate 120. Embodiments of the tube 140 can have a length 315 that is conducive to providing mechanical support to securely mount the cable 105 and to enable the cable 105 to have the required radiation performance by keeping the apertures in the cable's outer conductor a certain minimum distance away from a mounting surface. For example, in some embodiments, the tube's length 315 is a value in a range from about 5 to 200 mm and in some embodiments from about 50 to 80 mm.

The clamp 102 also includes a non-metal curled coupling member 150 sized to wrap around a portion of the cable 105. The clamp 102 also includes a non-metal coupling spacer 160. The coupling spacer 160 has a base portion 320 and spacing arms 325 projecting from the base portion 320. Ends 330 of the spacing arms 325 are configured to contact the curled coupling member 150. The base portion 320 has an opening 210 that is coaxial with the mounting opening 410 and the opening 310 in the tube 140, to accommodate the bolt shaft 135 there-through.

The length 327 of the spacer arms 325 is adjusted to be long enough so that metal components of the bolt module 130 do not touch the cable 105, and, not too long so as to allow excessive movement of the cable 102 in case of a fire that would destroy the curled coupling member 150 and coupling spacer 160. For example, in some embodiments, the spacer arm length 327 is a value in a range of about 50 to 150 percent of a diameter 328 of the cable 105. For example, in some embodiments, for a cable diameter 328 equal to about 48 mm, the arm length 327 can equal a value in a range from about 24 mm to 72 mm.

Embodiments of the apparatus 100 can further include metal cable ties 170. Each of the cable ties 170 are sized to wrap around a portion of the cable 105 and to pass through one of the metal cable tie openings 205 of the plate 120. One skilled in the pertinent art would understand how to select a length of cable tie 170 to wrap around the portion of the cable and be secured thereto and to select a width and thickness of the tie 170 to pass through one of the metal cable tie openings 205, so as to be able to support the load of the cable 105 when connected to the clamp 102.

Embodiments of the apparatus 100 can further include cable tie locks 215 configured secure to the cable ties 170 that are wrapped around the portion of the jacket 110. Metallic cable tie locks 215 are preferably located on the back side of the clamp module 102 so as to be remote from the cable 105 (e.g., the cable 105 connected to the front side of the clamp 102) and thereby minimize the production of intermodulation signals that could interfere with the signals being transmitted through the cable 105. One skilled in the pertinent art would be familiar with various cable tie locks configurations suitable for locking the ends of the cable tie 170 together due to mechanical friction.

In some embodiments, to avoid promoting the formation of intermodulation signals, the metal components of the clamp 102 (e.g., the bolt module 130, the metal cable ties 170, the cable tie locks 215 and in some embodiment the plate 120 and tube 140) are made of non-ferromagnetic metals and with a melting point that is higher than temperatures associated with building fires (e.g., 800° C. or higher). The term non-ferromagnetic metals as used herein refers to metals that do not contain metals elements that are strongly attracted to a magnetic field (e.g., iron, nickel, cobalt, gadolinium etc. . . . ) are free of, or only contain trace amounts (e.g., less than 1 wt %) of, such elements. A non-limiting example of an non-ferromagnetic metal is copper. Non-ferromagnetic metals as used herein also refer to metal alloys which contain such elements but which due to the alloy crystal structure are not strongly attracted to a magnetic field. A non-limiting example of such a non-ferromagnetic metal includes certain non-ferromagnetic stainless steel alloys, such as austenite steel.

In some embodiments the plate 120 and tube 140 are a continuous single piece. In other embodiments the plate 120 and tube 140 can be two separate pieces. In some embodiments the plate 120 and tube 140 are made of metal (e.g., copper or stainless steel) while in other embodiments the plate 120 and/or the tube 140 can be made of a non-metallic ceramic material.

In some embodiments, to avoid promoting the formation of intermodulation signals, the metal components of the clamp 102 are insulated from each other, e.g., such that there is no direct metal-to-metal contact or metal-on-metal movement.

For example, such insulation can be facilitated by embodiments of the clamp 102 that include a non-metal curled coupling member 150 and a non-metal coupling spacer 160. For example, in some embodiments, non-metal components of the clamp module 102 (e.g., the curled coupling member 150 and coupling spacer 160) are made of plastic such as polyamide or polypropylene.

For example, such insulation can be facilitated by embodiments of the cable tie openings 205 being surrounded by an electrical insulator 220 such that a cable tie 170 can pass through the insulator 220. The cable tie openings 205 can be sized to accommodate grommet insulators 220 made of soft pliable insulating material (e.g., plastics such as ethylene propylene diene monomer rubber, silicone, thermoplastic elastomers, etc.) that can be inserted into the openings 205. Alternatively, rigid plastic material (e.g., polyethylene, polypropylene, polyamide, etc.) can be molded to form the insulator 220 around the openings 205.

The curled coupling member 150 and coupling spacer 160 are sized to accommodate cables 105 of various sizes. For instance, in some embodiments, the cable 105 has an outer diameter 328 in a range from about ½ to 1⅝ inches. The cable 105 configured for radiating can include any conducting core material (e.g., copper core) surrounded by electrically insulator (e.g., polyethylene) and outer conducting material (e.g., copper foil) with slots or apertures to radiate (e.g., transmit or receive) RF signals to or from the cable, and outer insulating jacket 110 (e.g., ethylene-vinyl acetate, low density polyethylene or linear low density polyethylene polymer with flame retardant filler materials such as aluminum hydroxide or magnesium hydroxide), such as commonly used in the telecommunication industry.

Some embodiments of the jacket 110 include ridged indexes 340 such that ends 345 of the curled coupling member 150 rest on the ridged indexes 340 when the curled coupling member 150 is wrapped around the portion the cable 105. In some embodiments, the ends 345 have beveled shapes that contact the ridged indexes 340. The inclusion of ridged indexes 340 on the cable jacket 110 can facilitate orienting the cable 105 such that the slots or apertures face are on the front side of the clamp 102 and face outwards from a mounting surface.

Some embodiments of the curled coupling member 150 includes separate first and second curled members 420, 425 where interlocking ends 430, 435 of the members 420, 425 couple the members together 420, 425 and opposite ends 345 of members 420, 425 contact the jacket 110. In some embodiments, the separate first and second curled members 420, 425 are flexible enough to be bent outwards so as to allow the cable 105 to be pushed into the clamp module 102, with the ends 430, 435 having, e.g., a saw tooth shape such that the ends 430 435 can be locked together. In some embodiments, the separate first and second curled members 420, 425 are preferably made from non-metal material since the interlocking metal ends 430, 435 could cause external intermodulation signals.

Some embodiments of the bolt module 130 include a nut 440 (e.g., a rectangular-shaped nut), where one end 415 of the threaded shaft 135 is configured to screw into the nut 440 and the nut 440 is embedded in the base portion 320 of the coupling spacer 160 (e.g., the nut 440 fitting in a slot opening 442 made in the base portion 320). Alternatively, the bolt module 130 can include bolt shaft 135 whose end 415 includes a bolt head that is not embedded in the base portion 320 but rather contacts an outer surface 445 of the base portion 320 at the opening 210 where the shaft 135 passes through.

Figure 5:
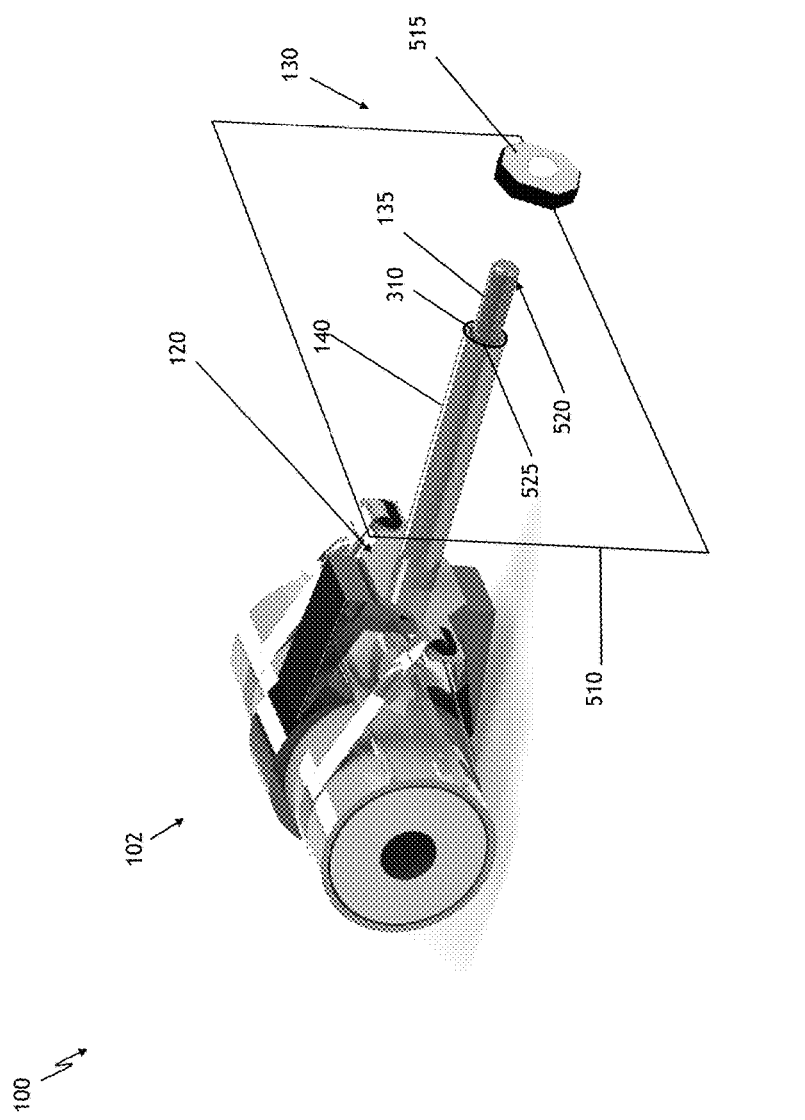
FIG. 5 presents a back-side perspective view of an example apparatus embodiment of the disclosure, analogous to the apparatus depicted in FIG. 3 and further showing a clamp being mounted to a mounting plate of a mounting surface.

FIG. 5 presents a back-side perspective view of an example apparatus embodiment of the disclosure, analogous to the apparatus view depicted in FIG. 3 and further showing a clamp 102 being mounted to a surface mounting plate 510 of the apparatus 100. The illustrated embodiment of the bolt module 130 includes a nut 515. The nut 515 is configured to fasten to the end 520 of the bolt shaft 135 that passes through the tube 140 and the plate 120 to thereby attach the clamp 102 to the surface mounting plate 510. For instance, the end 520 of the bolt shaft 135 can be passed through an opening 525 in the surface mounting plate 510 and the nut 515 then screwed onto the end 520. Alternatively, the end 520 of the shaft 135 can be configured as a threaded screw shaft that can be screwed into a dowel that is attached to a surface mounting plate or to another mounting structure (e.g., a ceiling beam) or to the mounting surface (e.g., a wall or ceiling) itself.

Figure 6:
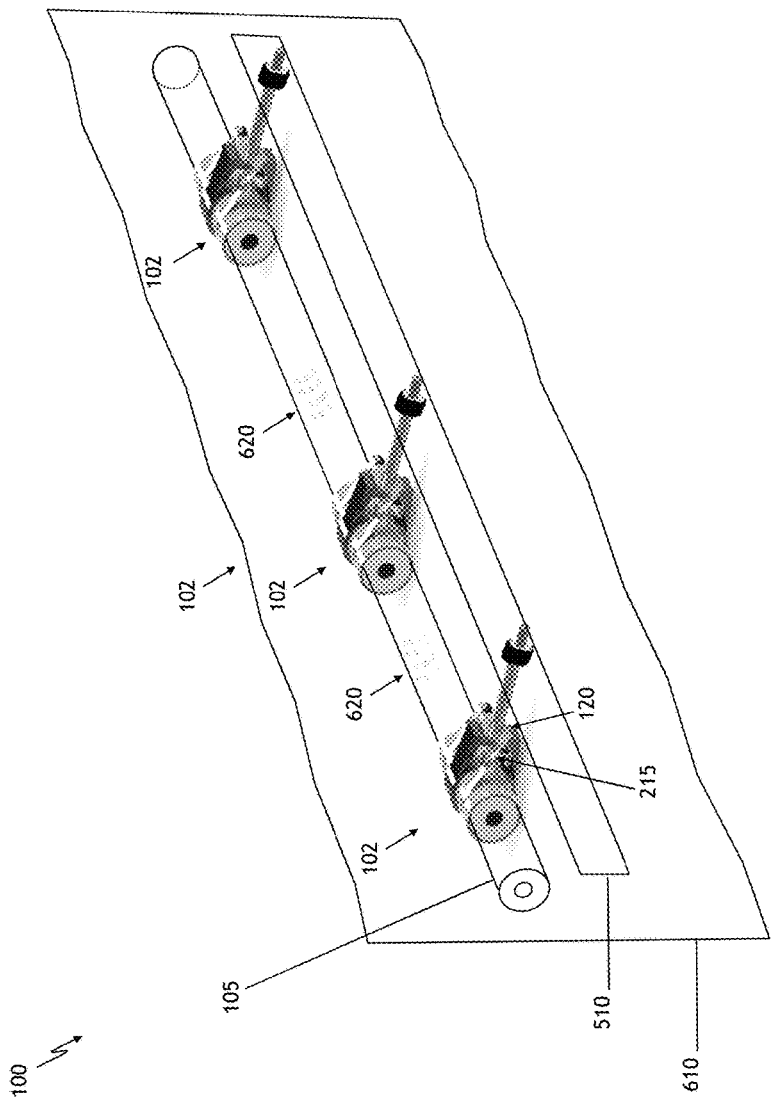
FIG. 6 presents a back-side perspective view of an example apparatus embodiment of the disclosure, analogous to the apparatus depicted in FIG. 5 and further showing plurality of the clamps holding a cable mounted to a mounting surface.

FIG. 6 presents a back-side perspective view of an example apparatus 100 embodiment of the disclosure, analogous to the apparatus 100 depicted in FIG. 5 and further showing a plurality of the clamps 102 and a cable 105 held by each one of the clamps 102 to thereby mount the cable 105 to a mounting surface 610 (e.g., via surface mounting plate 510 connected to a wall or ceiling surface 610). As illustrated the clamps 102 are configured to minimize intermodulation signals being received by the cable 105 by positioning the bulk of the metal components (e.g., the cable tie locks 215, mounting plate 120, bolt module 130) on the back side of the clamps 102 while the apertures 620 in the outer conductor of the cable 105 are positioned on the front side of the modules 102.

Embodiments of the apparatus 100 can be part of a wireless telecommunication system, e.g., a wireless indoor telecommunication system configured to provide broadband wireless coverage for a confined area (e.g., a tunnel, cave or indoor area). Some embodiments of the apparatus 100 creating intermodulation signals no greater than −155 dBc on any type of cable, including cables generating vertically or horizontally polarized fields.

Figure 7:
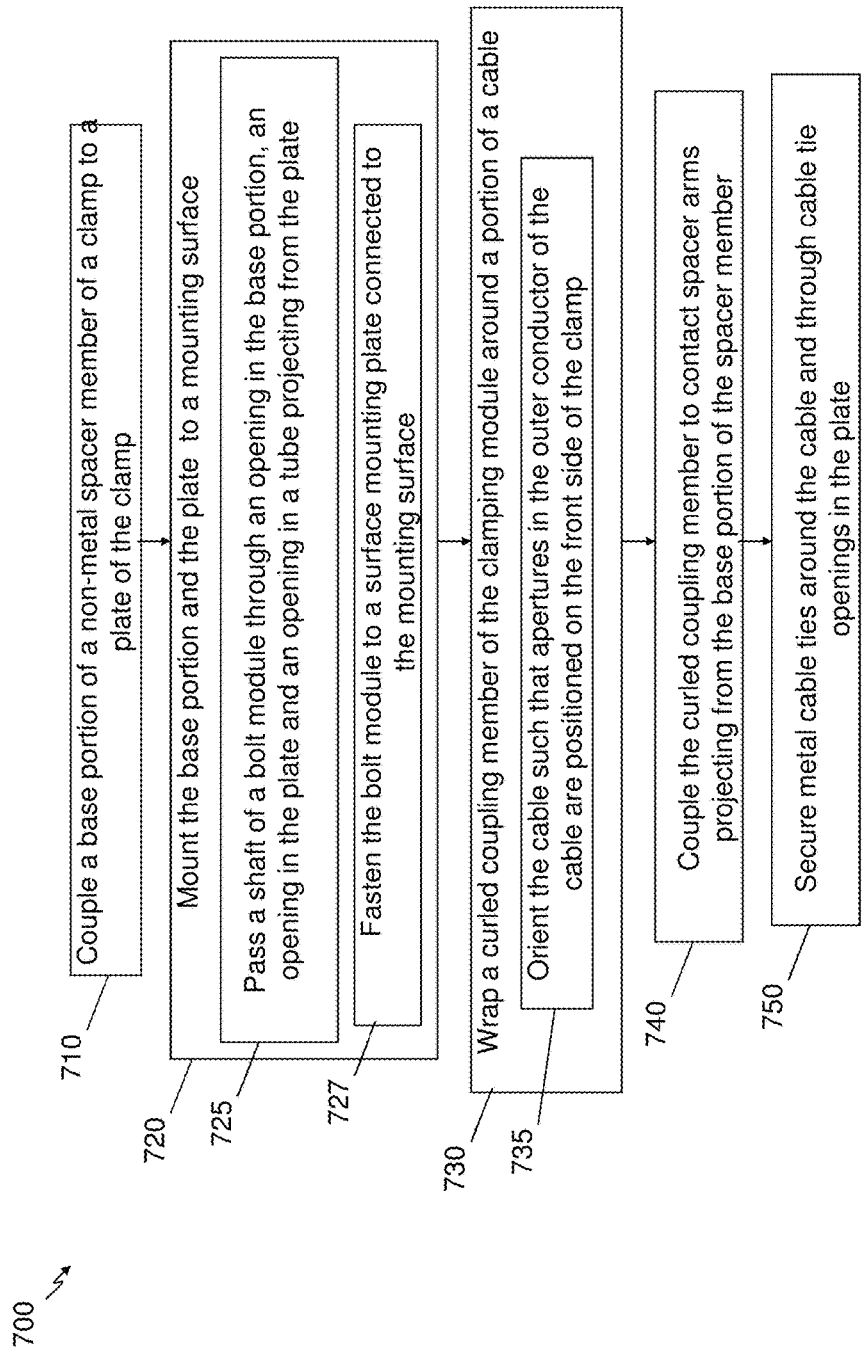
FIG. 7 presents a flow diagram of an example method of using the apparatus, include any of the apparatus examples described in the context of FIGS. 1-6.

Another embodiment of the disclosure is a method of using the apparatus to mount a cable. FIG. 7 presents a flow diagram of an example method 700 of using the apparatus, including any of the embodiments of the apparatus 100 described in the context of FIGS. 1-6;

With continuing reference to FIGS. 1-6 throughout, the method 700 comprises coupling (e.g., step 710) a base portion 320 of a non-metal coupling spacer 160 of a clamp 102 to a plate 120 of the clamp 102. The method 700 also comprises (e.g., step 720) mounting the base portion 320 and the plate 120 to a mounting surface 610, including passing (e.g., step 725) a shaft 135 of a bolt module 130 through an opening 210 in the base portion 320, an opening 410 in the plate 120 and an opening 310 in a tube 140 projecting from the plate 120. As disclosed in the context of FIGS. 1-6, the opening 210 in the base portion 320 and the opening 410 of the plate 120 are sized to stop an end 415 of the bolt module 130 from passing through. The tube 140 projects from the plate 120, and, the opening 310 in the tube 140 is coaxial with the mounting opening 410. The method 700 further comprises wrapping (e.g., step 730) a curled coupling member 150 of the clamp 102 around a portion of a cable 105. The method 700 also comprises coupling (e.g., step 740) the curled coupling member 150 to contact spacer arms 325 projecting from the base portion 320 of the coupling spacer 160.

Embodiments of the method 700 can further include securing (e.g., step 750) metal cable ties 170 around the cable 105 and through cable tie openings 205 in the plate 120.

In some embodiments of the method 100, mounting the base portion 320 and the plate 120 to a mounting surface 610 (e.g., step 720) includes fastening (e.g., step 727) the bolt module 130 to a surface mounting plate 510 connected to the mounting surface 610.

In some embodiments of the method, wrapping the curled coupling member 150 around the portion of the cable 105 (e.g., step 730) includes orienting (e.g., step 735) the cable 105 (e.g., rotating the cable as guided using ridged indexes 340 on the cable jacket 110) such that apertures 620 in the outer conductor of the cable 105 are positioned on the front side of the clamp 102 (e.g., such that ends 345 of the curled coupling member 150 contact the ridged indexes 340).

The method 700 can include repeating steps 710-750 to connect the cable 105 to a plurality of the clamps 102 mounted to the mounting surface 610.

Figure 8:
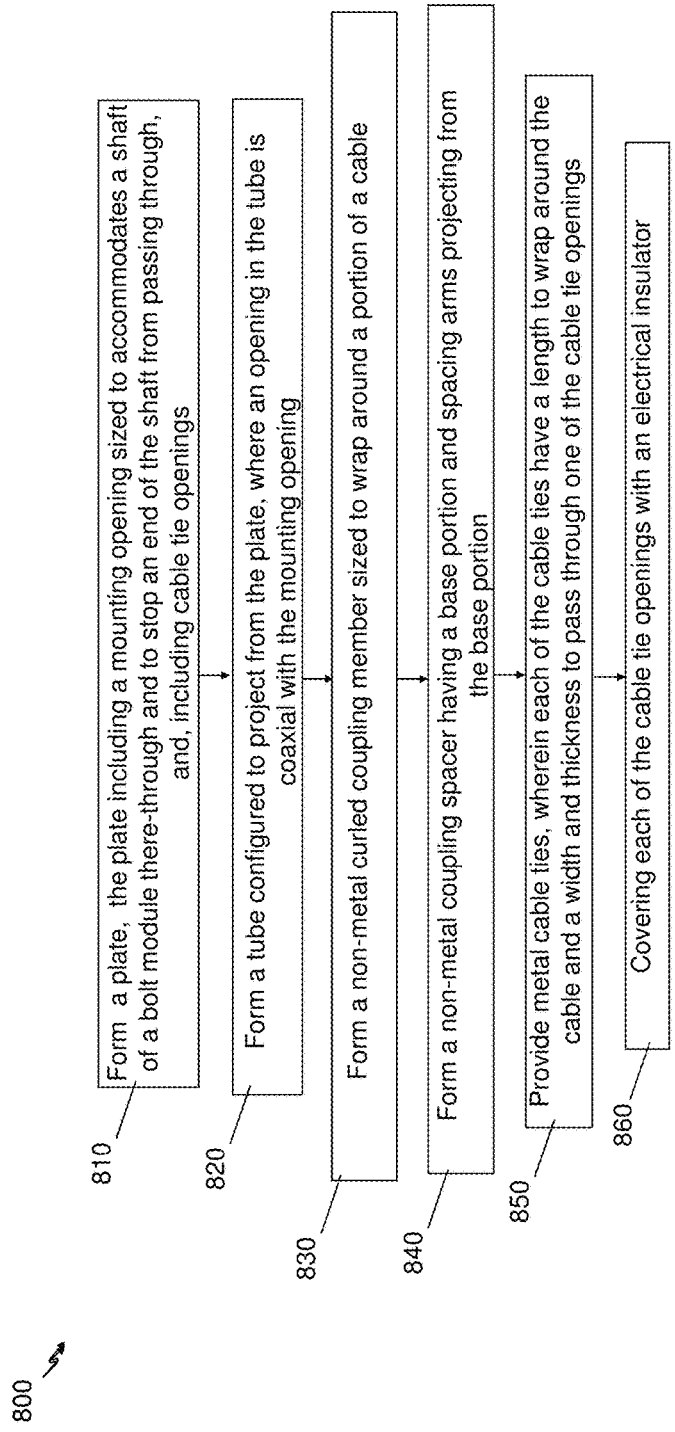
FIG. 8 presents a flow diagram of an example method of making the apparatus, include any of the apparatus examples described in the context of FIGS. 1-6.

Another embodiment of the disclosure is a method of manufacturing the apparatus. FIG. 8 presents a flow diagram of an example method 800 of making the apparatus, include any of the embodiments of the apparatus 100 described in the context of FIGS. 1-6.

With continuing reference to FIGS. 1-6 throughout, the method 800 comprises forming (e.g., step 810) a plate 120, the plate 120 including a mounting opening 410, sized to accommodates a shaft 113 of a bolt module 130 therethrough and to stop an end of the shaft 113 from passing through, and, including cable tie openings 205. One skilled in the pertinent art would be familiar with techniques to form the plate 120 and the openings 205, 410, e.g., by CNC milling, mechanical stamping, water jet or laser cutting a metal or ceramic sheet.

The method 800 also comprises forming a tube 140 (e.g., step 820) configured to project from the plate 120, where an opening 310 in the tube is coaxial with the mounting opening 410. In some embodiments the tube 140 can be provided from a commercial source and then as part of step 820 welded or otherwise connected to the plate 120 so as to project from the plate 120.

The method also comprises forming (step 830) a non-metal curled coupling member 150 sized to wrap around a portion of a cable 105, and, forming (step 840) a non-metal coupling spacer 160 having a base portion 320 and spacing arms 325 projecting from the base portion 320. As disclosed in the context of FIGS. 1-6, ends 330 of the spacing arms 325 are configured to contact the curled coupling member 150 and the base portion 320 has an opening 210 which, when coupled to the plate 120 and tube 140, is coaxial with the mounting opening 410 and the tube opening 310. One skilled in the pertinent art would be familiar with techniques, e.g., CNC milling of plastic bodies, plastic molding or thermoforming of suitable polymers mixed with flame retardant filler material, to form the curled coupling member 150 and the coupling spacer 160. In some embodiments as part of step 840 two halves of the base portion 320 are molded or machined to form a slot opening 442 therein, a nut 440 of the bolting module 130 is inserted into the slot 442 and then the two halves of the two halves of the base portion 320 are sealed together.

Embodiments of the method 800 can further include providing (e.g., step 850) metal cable ties, wherein each of the cable ties have a length to wrap around the cable 105 (e.g., to wrap around an insulating jacket 110 of the cable 105) and a width and thickness to pass through one of the cable tie openings 205. For example as part of step 850 a stainless steel ribbon of the appropriate width and thickness can be cut to the appropriate length using procedures familiar to those skilled in the pertinent art.

Embodiments of the method 800 can further include covering (step 860) each of the cable tie openings 205 with an electrical insulator 220. For instance as part of step 860 pre-fabricated grommet insulators can be inserted into the tie openings 205 or the openings can be over-molded with a plastic insulating material.

Those skilled in the art to which this application relates will appreciate that other and further additions, deletions, substitutions and modifications may be made to the described embodiments.

What is claimed is:

1. An apparatus, comprising:
   a clamp, including:
      a plate, the plate including:
         a mounting opening to accommodate a shaft of a bolt module there-through and to stop an end of the bolt module from passing through, and
         cable tie openings;
      a tube projecting from the plate, where an opening in the tube is coaxial with the mounting opening;
      a non-metal curled coupling member sized to wrap around a portion of a cable; and
      a non-metal coupling spacer member having a base portion and spacing arms projecting from the base portion, wherein ends of the spacing arms are configured to contact the curled coupling member and the base portion has an opening coaxial with the mounting opening and the opening in the tube.

2. The apparatus of claim 1, further including metal cable ties, wherein each of the cable ties is sized to wrap around the portion of the cable and to pass through one of the metal cable tie openings.

3. The apparatus of claim 1, further including cable tie locks configured to secure cable ties that are wrapped around a portion of the cable, the cable tie locks locatable on the backside of the clamp module.

4. The apparatus of claim 1, wherein the plate, bolt module and the metal cable ties are made of a non-ferromagnetic metal.

5. The apparatus of claim 1, wherein the curled coupling member and the coupling spacer are made of plastic.

6. The apparatus of claim 1, wherein the cable tie openings are surrounded by an electrical insulator, the insulator configured to accept a cable tie there-through.

7. The apparatus of claim 1, wherein the curled coupling member has ends configured to rest on ridged indexes provided on a jacket of the cable when the curled coupling member is wrapped around the portion of the cable.

8. The apparatus of claim 1, wherein the curled coupling member includes a first curled member and second curled member where interlocking ends couple the first and second curled members together and opposite ends of the first and second curled members contact the cable.

9. The apparatus of claim 1, wherein the bolting module includes a nut embedded in the base portion of the coupling spacer member, wherein one end of the shaft of the bolting module is a threaded shaft configured to screw into the nut.

10. The apparatus of claim 1, wherein the bolt module further includes a nut configured to fasten to the end of the bolt shaft that passes through the tube of the mounting plate to thereby attach the clamp to a surface mounting plate.

11. The apparatus of claim 1, further including a plurality of the clamps and a cable held by each one of the clamps.

12. The apparatus of claim 1, wherein the apparatus is part of a wireless telecommunication system.

13. An assembly, comprising:
    a clamp, including:
       a plate, the plate including:
          a mounting opening to accommodate a shaft of a bolt module there-through and to stop an end of the bolt module from passing through, and
          cable tie openings;
       a tube projecting from the plate, where an opening in the tube is coaxial with the mounting opening;
       a non-metal curled coupling member sized to wrap around a portion of the cable; and
       a non-metal coupling spacer member having a base portion and spacing arms projecting from the base portion, wherein ends of the spacing arms are configured to contact the curled coupling member and the base portion has an opening coaxial with the mounting opening and the opening in the tube; and
    a cable, the cable including apertures in the outer conductor of the cable that are positioned on the front side of the clamp.

14. The assembly of claim 13, wherein the cable is configured to radiate RF signals through the apertures.

* * * * *